Patented Sept. 12, 1933

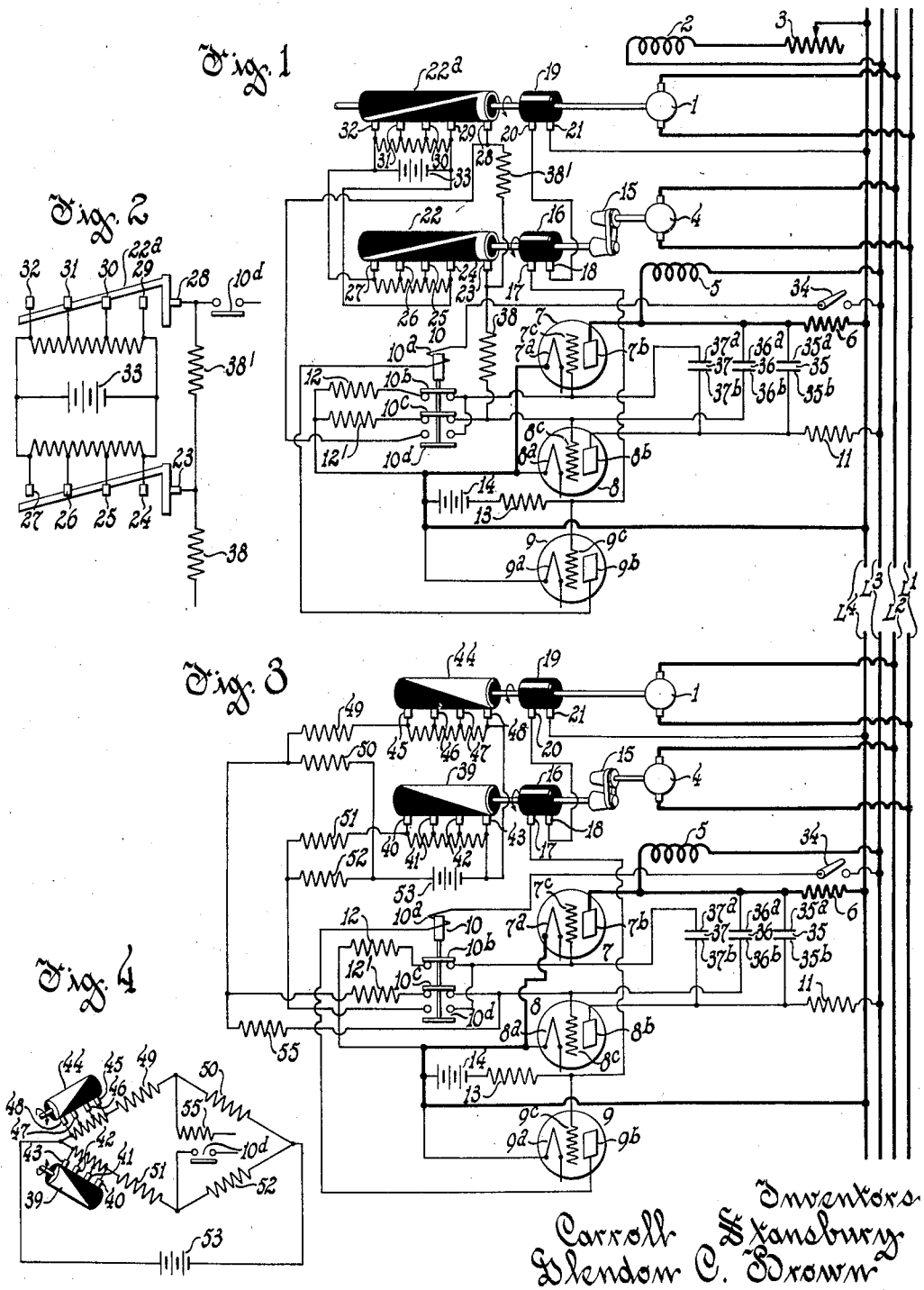

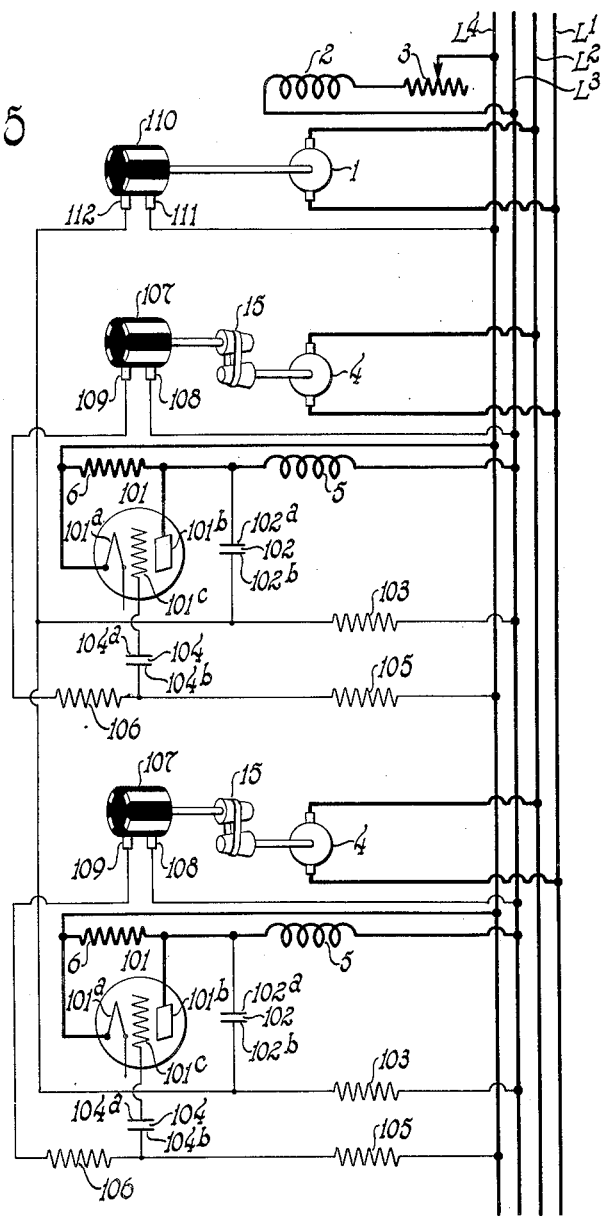

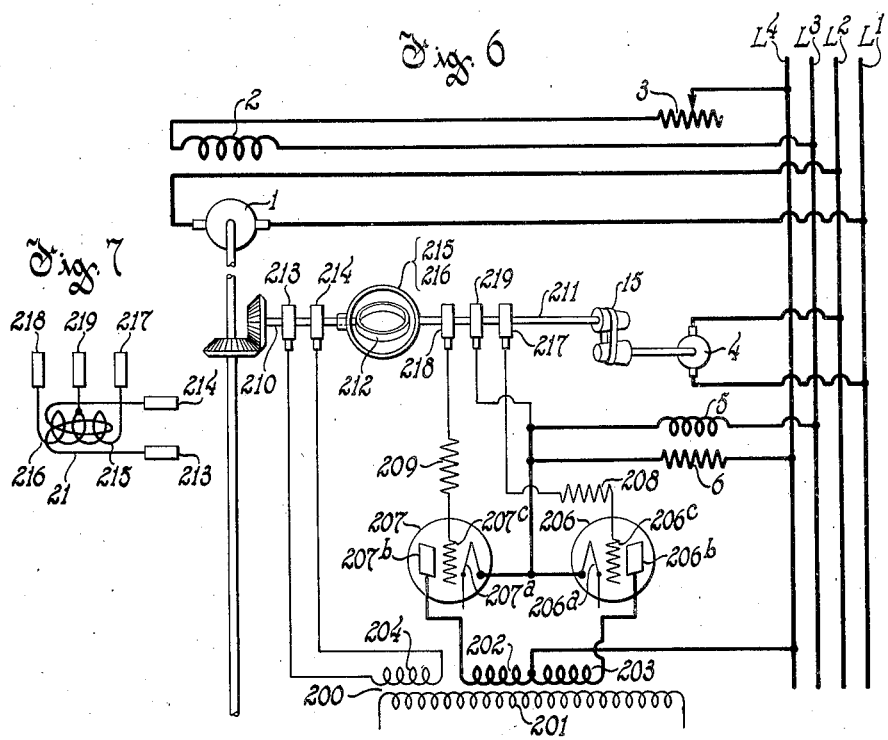
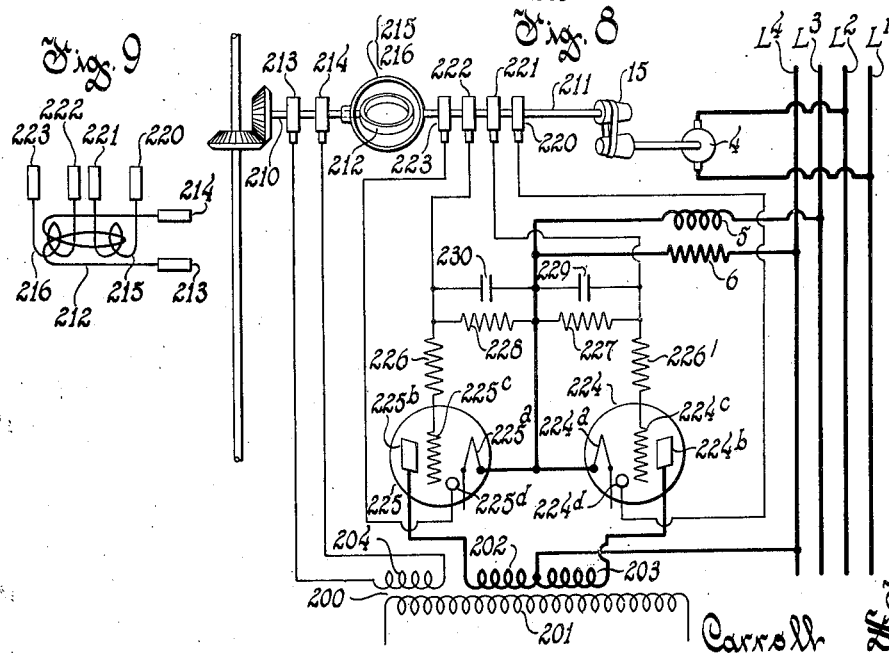

1,926,822

UNITED STATES PATENT OFFICE 1,926,822

PAPER MACHINE DRIVE

Carroll Stansbury, Wauwatosa, and Glendon C. Brown, Milwaukee, Wis., assignors to Cutler-Hammer, Inc., Milwaukee, Wis., a corporation of Delaware Application March 12, 1931. Serial No. 521,980

20 Claims. (Cl. 172—293)

This invention relates to speed regulators for electric motors.

The invention is particularly applicable to paper machines and similar installations, where it is desired to drive several sections of the machine, each by an individual motor, and maintain a constant speed relation between the various sections.

An object of the invention is to provide a regulator for two or more motors which shall accurately maintain a constant speed ratio between the several motors.

Another object is to provide a regulator of the aforementioned type which is quick in response.

Another object is to provide a regulator which is practically devoid of electrical or mechanical inertia effects tending to cause hunting between various parts upon changes in operating conditions.

Another object is to provide a regulator which requires a minimum of power for initiation of the regulating action upon changes in operating conditions, thus resulting in quicker and more accurate response.

Other objects and advantages will hereinafter appear.

The accompanying drawings illustrate several modifications of the system for carrying out our invention; it will, however, be understood that the system is capable of many other modifications, all within the scope of the appended description and claims.

In the drawings:

Figure 1 diagrammatically illustrates the system as applied to the regulation of the speed relation between two motors, wherein an electrical differential consisting of two potentiometers is employed.

Fig. 2 is a simplified diagram of a part of the electrical circuit employed in Fig. 1;

Fig. 3 is a modification of the system in Fig. 1;

Fig. 4 is a simplified diagram of a part of the electrical circuit employed in Fig. 3;

Fig. 5 is another modification of the system, which requires a minimum of apparatus;

Figs. 6 and 8 are two modifications of the system in Figs. 1 and 3, while

Figs. 7 and 9 are simplified diagrams of parts of the circuit illustrated in Figs. 6 and 8, respectively.

Referring to Fig. 1, $L^1$ and $L^2$ are supply lines for the armatures of the various motors, which may be supplied with power from a variable voltage generator for varying simultaneously the armature voltage of all motors, so as to vary their speed in the same proportion. $L^3$ and $L^4$ are respectively the positive and negative lines of a constant voltage direct current power supply. 1 is the armature and 2 the field winding of the "leading" motor of the machine which determines the relative speed at which all of the "following" motors are to operate, subject to individual manual adjustment of their speed ratio relative to the "leading" motor. The strength of the field 2 may be varied by the regulator 3. The armature 4 of one of the several "following" motors, which are controlled in a like manner, is connected across the lines $L^1$ and $L^2$. The "following" motor has a field winding 5 which has one terminal directly connected to the line $L^3$, while its other terminal is connected through an impedance 6 to the line $L^4$. The system includes three gaseous electron tubes 7, 8 and 9 having, respectively, heated cathodes $7^a$, $8^a$, $9^a$, anodes $7^b$, $8^b$, $9^b$ and grids $7^c$, $8^c$, $9^c$. The anode $7^b$ is connected to the junction between the field 5 and the impedance 6; cathodes $7^a$, $8^a$ and $9^a$ are connected to line $L^4$. Anode $8^b$ is connected to line $L^3$ in series with a resistance 11. Anode $9^b$ is connected in series with a winding $10^a$ of an electromagnetic relay 10 and a switch 34 to the line $L^3$. The relay 10 has normally closed contacts $10^b$ and $10^c$ and normally open contacts $10^d$. Grids $7^c$ and $8^c$ are connected respectively through contacts $10^b$ and $10^c$ and resistances 12 and $12^1$ to line $L^4$, while grid $9^c$ is connected through a resistance 13 and a battery 14 which has its negative terminal nearest to the resistance, to the line $L^4$. Coupled to the shaft of armature 4 through an adjustable ratio transmission gear 15 is a cylinder 16 which intermittently closes the circuit between two brushes 17 and 18. A similar cylinder 19 mounted on the shaft of the leading motor makes intermittent contact with the brushes 20 and 21. Brush 17 is connected to grid $9^c$, brush 18 is connected to brush 20 and brush 21 is connected to line $L^4$, so that when cylinders 16 and 19 bridge simultaneously their corresponding brushes, the potential of line $L^4$ is impressed upon grid $9^c$. Coupled to the shaft of the adjustable ratio gear 15 is a second cylinder 22 having a continuous contact ring which permanently engages a brush 23, and extending from said ring a spiral contact segment which alternately makes contact with the brushes 24 to 27, inclusive, when the cylinder rotates. Resistors are connected in circuit between each two adjacent brushes 24 to 27, inclusive. A similar cylinder $22^a$ having similar cooperating brushes 28 and 29 to 32, inclusive, the latter being bridged by resistances similar to those bridging contacts 24 to 27, inclusive, is mounted on the shaft of armature 1. A battery 33 is connected between brushes 32 and 29 while conductors connect the brush 32 with brush 27 and brush 29 with brush 24. A conductor leads from brush 28 to contacts $10^d$, while a resistance 38 connects brush 23 with contacts $10^c$. A condenser 35 is connected between the anodes $7^b$ and $8^b$, a second condenser 36 connects anode $7^b$ with the grid $8^c$, while a third condenser 37 connects anode $8^b$ with grid $7^c$. A resistance $38^1$ is connected between brushes 28 and 23.

Fig. 2 is a simplified diagram of the connections of the commutators 22 and $22^a$, the battery 33 and the related resistances.

The system illustrated in Figs. 1 and 2 operates as follows:

To start the machine, the lines $L^1$, $L^2$ and $L^3$, $L^4$ are energized, the former preferably at a low voltage. The motor field 2 being thereby energized, armature 1 begins to revolve and comes up to a certain speed. Motor field 5 is also energized by a current from $L^3$ through the field 5, impedance 6 to line $L^4$, and as armature 4 receives current at a voltage corresponding to that of armature 1 it also begins to accelerate. A voltage from the lines $L^3$, $L^4$ is also impressed upon the cathodes and anodes of tubes 7 and 8. The grids $7^c$ and $8^c$ are connected to their respective cathodes through the contacts $10^b$ and $10^c$ and the resistances 12 and $12^1$, and have therefore no potential with respect to the cathodes and are incapable of preventing current flow. Current flow through tube 8 will start prior to that of tube 7, on account of the inductive lag of the voltage impulse in field 5. The starting of current flow through tube 8 lowers the potential of condenser plate $35^b$ below its former value, which was that of line $L^3$, and this also causes lowering of the potential of condenser plate $35^a$, thus further delaying the start of current flow through tube 7. After the current in tube 8 has become steady, however, the potential across tube 7 will ultimately be sufficient to start current flow therethrough, thereby shunting the impedance 6 and strengthening the field 5 to its maximum value. The sudden flow of current through tube 7 lowers the potential of condenser plate $35^a$ to a value only slightly higher than that of line $L^4$, resulting in a corresponding drop of potential of plate $35^b$ and anode $8^b$, so that the voltage between anode $8^b$ and cathode $8^a$ is momentarily insufficient to maintain current in tube 8, and current ceases to flow. Simultaneously the potential of condenser plate $36^a$ is lowered, resulting in a lowering of potential of plate $36^b$ and grid $8^c$ below that of cathode $8^a$, thus temporarily preventing re-establishment of current flow in tube 8. However, the charge of condenser 35 leaks off through the circuit from $35^a$, over winding 5, through the line and resistance 11 to plate $35^b$, so that the potential across tube 8 is again sufficient to establish current flow, if the grid potential did not prevent it. The charge of condenser 36 also leaks off over a circuit from $36^a$, over tube 7, resistance $12^1$, contacts $10^c$ to plate $36^b$, the rate of discharge depending upon the value of resistance $12^1$. The grid $8^c$ thus eventually attains a potential which is low enough to permit again current flow through tube 8. The sudden flow of current through the tube 8 lowers the potential of the condenser plate $35^b$ which was substantially that of the line $L^3$ to a lower value determined by the drop through the resistance 11, this value being only slightly higher than that of the line $L^4$. The drop of the potential of condenser plate $35^b$, in turn, causes a corresponding drop of the condenser plate $35^a$ and the anode $7^b$ connected thereto with the result that the voltage between the anode $7^b$ and the cathode $7^a$ is momentarily insufficient to maintain current in the tube 7 and current flow therethrough ceases. Simultaneously the potential of condenser plate $37^b$ is lowered resulting in a lowering of potential of plate $37^a$ and grid $7^c$ below that of the cathode $7^a$, thus temporarily preventing re-establishment of current flow in tube 7. However, the charge of condenser 35 leaks off through a circuit from $35^b$ over resistance 11 through the line and winding 5 to plate $35^a$ so that ultimately the potential across the tube 7 is again sufficient to establish current flow, if the potential of the grid $7^c$ does not prevent it. The charge of condenser 37 also leaks off over a circuit from $27^b$ over tube 8, resistance 12, contact $10^b$, to plate $37^a$, the rate of discharge depending upon the value of the resistance 12. The grid $7^c$ thus eventually attains a potential which again permits current flow through the tube 7. Thus the resistance 6 in series with field 5 is alternately cut in and out of circuit, and the field strength of the motor attains an average value, depending upon the relative time intervals during which the tubes 7 and 8 are alternately conducting.

After the "following" motor has accelerated to approximately the speed of the "leading" motor the switch 34 is closed, thereby impressing potential upon tube 9. But the tube 9 is prevented from conducting current by the negative potential which is impressed upon its grid $9^c$ by the battery 14. As the armatures 1 and 4 revolve the commutators 16 and 19 periodically close the circuit between brushes 17 and 18, and 20 and 21, respectively. When the motor reaches synchronism so that circuit is closed at both commutators simultaneously, the battery 14 is shunted through resistance 13 and the grid $9^c$ is directly connected to cathode $9^a$, thus reducing the negative potential of said grid and permitting current flow through tube 9 to energize relay coil $10^a$ in series therewith. The relay thereupon opens contacts $10^b$ and $10^c$ and closes contact $10^d$. After the relay is energized through conduction of current through tube 9, the grid $9^c$ cannot exert any more controlling influence upon the tube, and the relay stays closed. This disconnects the grids $7^c$ and $8^c$ from the respective resistances 12 and $12^1$ and connects grid $7^c$ through brush 28 to commutator $22^a$, while grid $8^c$ is permanently connected through resistance 38 and brush 23 to commutator 22. If the two commutators revolve at the same speed and have the same angular position relative to their respective contacts, no potential difference exists between contacts 23 and 28, though the voltage of these contacts varies periodically with respect to the battery, but always equally. If, however, armature 4 tends to advance relative to armature 1, the potential of brush 23 becomes negative relative to that of brush 28. As a result the discharge of condenser 36 from $36^a$ over anode $7^b$, grid $7^c$, contact $10^d$, commutators $22^a$ and 22, resistance 38 to plate $36^b$ is retarded, while the discharge of condenser 37 from plate $37^b$, over anode $8^b$, grid $8^c$, resistance 38, commutators 22 and $22^a$, contact $10^d$ to plate $37^a$ is accelerated. As a result the conduction period of tube 7 during which the field current of the "following" motors has a high value is lengthened relative to the conduction period of the tube 8 during which the field current has a low value. This strengthens the motor field and slows down the armature 4 until the two commutators again attain the same angular position. Conversely if the armature 4 slows down relative to armature 1 the field 5 is weakened by an action similar to the one just described, except that the voltage between brushes 23 and 28 and its effect upon the action of the tubes 7 and 8, is the reverse of that described.

It is obvious that if automatic locking into step is not required the tube 9 and the relay 10 may be omitted, the circuits of the grids $7^c$ and $8^c$ being commutated by hand, without changing the action of the apparatus in thereafter maintaining the speed ratio of the two motors constant. If it is desired to change the speed of the armature 4 relative to that of armature 1, the setting of the speed change gear 15 is varied accordingly. To change the speed of all motors proportionally the voltage of the lines $L^1$, $L^2$ is varied, while for relatively small variations in speed the regulator 3 may be adjusted. This varies the speed of armature 1 and through the regulating means aforedescribed the strength of the field 5 is regulated to maintain synchronism between the motor armatures.

The system illustrated in Figs. 3 and 4 differs from that of Figs. 1 and 2 only in the manner in which the potential of the grids $7^c$ and $8^c$ is influenced. Resistances 49, 50, 51 and 52 form parts of a Wheatstone bridge. The side of the bridge containing resistor 49 has in series with the latter additional resistance connected between the brushes 45 to 48, inclusive, of a commutator 44, while in series with resistance 51 is another resistance connected between the brushes 40 to 43 of a similar commutator 39. The total values of the resistance in each branch of the Wheatstone bridge are preferably equal, but they may be proportioned otherwise. The commutators 39 and 44 which are respectively mounted on the shaft of the speed change gear and the leading motor armature shaft have conducting segments preferably in the shape of a right angle triangle with one side of its right angle parallel to the axis of the cylinder. When the cylinders revolve they make contact with their respective brushes and short circuit more or less resistance in the respective branch of the bridge. A battery 53 supplies voltage to the Wheatstone bridge, it being connected across diagonal points thereof, while the other two diagonal points are each connected to one of the grids $7^c$ and $8^c$ when the relay 10 is energized. Inserted in the connection to the grid $8^c$ is a resistance 55.

Only so much of the operation of the system of Figs. 3 and 4 which differs from that of Figs. 1 and 2 will be described. When the armature 1 tends to advance relative to armature 4, commutator 44 shorts out at any moment a greater part of the resistance in its related bridge branch than commutator 39, thereby unbalancing the bridge circuit and producing a potential difference between the circuits of the grids $7^c$ and $8^c$ and making grid $8^c$ more positive and grid $7^c$ more negative, which results in weakening of the motor field 5 and increasing of the speed of armature 4 in the manner aforedescribed. Conversely if the motor armature 1 slows down relative to armature 4, the commutator 39 cuts out at any moment a larger amount of resistance than commutator 44, thus increasing the potential impressed on grid $7^c$, and decreasing that impressed on grid $8^c$. This as aforedescribed results in strengthening the field winding 5 and slowing down of the armature 4.

Referring now to Fig. 5, it will be seen that the field resistance 6 is shunted by a gaseous electron tube 101, having a heated cathode $101^a$, an anode $101^b$ and a grid $101^c$. A condenser 102, having plates of opposite polarity $102^a$ and $102^b$ has plate $102^a$ connected to the junction between resistance 6 and field 5, while plate $102^b$ is connected in series with a relatively high impedance 103 to the line $L^3$. A second condenser 104 has its one terminal $104^a$ connected to grid $101^c$ and its other terminal $104^b$ in series with a relatively high impedance 105 to line $L^4$. Mounted on the shaft of the speed change gear 15 is a commutator 107, having on its circumference a series of conducting segments, which, when the cylinder rotates, intermittently bridge stationary contacts 108 and 109. A cylinder 110 of like construction with cooperating contacts 111 and 112 is mounted on the shaft of the leading armature 1. A relatively low impedance 106 is connected between terminal $104^b$ and brush 109. Contact 108 is connected to line $L^3$. Contact 111 is connected to line $L^4$, while contact 112 is connected to condenser terminal $102^b$.

The operation of the system shown in Fig. 5 may be explained as follows:

If the armatures 1 and 4 run in synchronism a current flows from line $L^3$ through the field winding 5 and tube 101 to line $L^4$. The cylinder 110 intermittently closes a circuit from line $L^4$, through impedance 103, and cylinder 110 to line $L^3$. When this circuit is open condenser terminal $102^b$ has the potential of line $L^3$, while the potential of terminal $102^a$ is higher than that of cathode $101^a$ by an amount corresponding to the drop of potential in the tube 101. Upon closure of the aforementioned circuit by cylinder 110 the potential of terminal $102^b$ is suddenly caused to drop to that of line $L^4$, resulting in a drop of potential of $102^a$ and anode $101^b$ by a like amount. This momentarily stops current flow through tube 101, and the current of the field 5 is reduced through the resulting increase of the impedance of its circuit. As soon as the cylinder 110 again opens the circuit the tube reestablishes current flow, if it is not prevented from so doing by a negative potential on the grid $101^c$ which is due to an effect which will now be described.

If, while the tube is conducting, the armature 4 rotates and circuit is closed by cylinder 107, the condenser terminal $104^b$ acquires a positive potential, and the condenser 104 is charged through the tube. The potential of the grid and plate $104^a$ in that event is nearly that of the cathode, so that if now the circuit of cylinder 110 is opened as aforedescribed the tube is prevented from re-establishing current flow, because the negative grid potential of the condenser plate $104^a$ cannot leak off. If, however, the cylinder 107 again closes its contact the potential of terminal $104^b$ is suddenly changed to approximately that of line $L^3$, which results in a corresponding change to a more positive value of terminal $104^a$ and grid $101^c$ so that now tube 101 becomes again conducting until it is stopped by closure of the circuit by cylinder 110.

If both armatures are in synchronism and in phase the two cylinders close circuit simultaneously so that the tube tends to conduct practically continuously and motor field 5 tends towards a maximum strength. This causes armature 4 to slow down, so that the contact of commutator 107 is still open for a short interval after commutator 110 has closed circuit, and therefore the tube is prevented from conducting current for an interval depending upon the angular displacement of the two commutators. In practice there will always be alternate circuit opening and closure by the commutators 107 and 110, resulting in a continuous variation of the field current above and below a value which accurately establishes the correct speed of motor 4.

A second "following" motor is illustrated in Fig. 5, and the mode of its operation is the same as that described heretofore.

While the commutators 107 and 110 are illustrated each with several conducting segments so as to initiate several controlling effects during each revolution, it may be advisable to reduce that number, especially when the machine operates at high speed. It is also possible to provide for several commutators on each shaft with a different number of segments, or for arrangement of the segments in groups and for manual or automatic means for changing from one type of commutator to another or for commutation of the various segments, so as to adjust the number of controlling effects per revolution to the operating speed of the machine.

Figs. 6 and 7 illustrate a system in which the energy for controlling the field strength is derived from an alternating current source. A transformer 200 has a primary winding 201 and three secondary windings 202 to 204, inclusive. The windings 202 and 203 are alike and are connected in series. Their center terminal is connected to the line $L^4$, while the two outer terminals are respectively connected to the anodes $207^b$ and $206^b$ of two thermionic gaseous tubes 207 and 206, respectively. The tubes have in addition cathodes $206^a$ and $207^a$, and grids $206^c$ and $207^c$, respectively. The cathodes are connected together and are also connected to the junction between field winding 5 and field resistance 6. Hence the two tubes with the corresponding transformer windings 202 and 203 form shunt paths in parallel with the resistance 6. Alternate half waves of unidirectional current flowing through the tubes are superposed upon the direct current from lines $L^3$, $L^4$ through resistance 6, thereby increasing the voltage drop through the latter and decreasing the current in the field winding 5. Mounted on the shaft 211 of the speed changer 15 are two coils 215 and 216 which are joined in series and connected to slip rings 217, 218 and 219. The rings 217 and 218 are respectively connected to the grids $206^c$ and $207^c$ through resistances 208 and 209 while the ring 219 is connected to the cathodes $206^a$ and $207^a$.

The armature 1 is provided with a shaft which runs the full length of the machine and which through suitable gears drives a shaft 210 which is in line with shaft 211. Mounted on the shaft 210 and concentric with coils 215 and 216 is a coil 212 provided with slip rings 213 and 214 which are connected to the terminals of winding 204.

It is obvious that coils 215—216 and 212 form respectively the two windings of a rotary transformer. When the axes of the two coils are parallel their mutual inductance is a maximum, while when they are at right angles it is a minimum.

If the two shafts 210 and 211 rotate in synchronism and the coils 215 and 216 are at right angles with coil 212 no voltage is induced in coils 215 and 216, and the voltage of the grids $206^c$ and $207^c$ with reference to their respective cathodes is zero, so that current flows through each tube during the entire positive half cycle of the alternating voltage impressed upon them, and the current in the field 5 is a minimum and armature 4 revolves at a high speed. On the other hand, when the coils 215 and 216 are parallel with coil 212 a voltage is induced in the former which is in phase with or opposed to that of winding 212, and to that of windings 203 and 204, depending upon whether the coil 212 is leading or lagging. In the latter case the voltage impressed upon the grids is negative at the interval when the anode voltage is positive, and thus prevents current flow in the tube during the positive half cycle whereby the field is strengthened. This causes slowing down of armature 4. If the coil 212 is leading the grids become positive during the positive half cycles, thus permitting flow of current through the tubes. The field current therefore becomes a minimum and the armature 4 tends to operate at its highest speed. If as a result of this the shaft 211 has reduced its angle of lag relative to shaft 210, the grids become again negative and thus cause strengthening of the field, as will be obvious.

Figs. 8 and 9 illustrate a modification of the system illustrated in Figs. 6 and 7. The two coils 215 and 216 are independent of each other and connected to the respective slip rings 220, 221 and 222, 223. Slip rings 220 and 223 are respectively connected to auxiliary anodes $224^d$ and $225^d$ of gaseous thermionic tubes 224 and 225. The tubes have respectively cathodes $224^a$ and $225^a$, main anodes $224^b$ and $225^b$ and grids $224^c$ and $225^c$. Slip ring 221 is connected through resistance $226^1$ to grid $224^c$ and slip ring 222 through resistance 226 to grid $225^c$. A resistance 227 and parallel condenser 229 are connected between grid $224^c$ and cathode $224^a$ and a similar resistance 228 and parallel condenser 230 are connected between the grid $225^c$ and cathode $225^a$. The two cathodes are jointly connected to the junction of winding 5 and resistance 6. Current flow through the tubes thus affects the speed of the motor in the same manner as was described in connection with Fig. 6. When the two shafts 210 and 211 rotate at the same speed the coil 212 induces a voltage in the coils 215 and 216 as described heretofore, but their effect upon the discharge through the tubes is different, as will be explained in the following by considering the tube 224.

Normally, the coil 212 on one hand, and coils 215 and 216 on the other hand rotate at a certain angular position relative to each other, the angle being such that the voltages induced in coils 215 and 216 are opposed in phase to the voltages impressed between the main electrodes of their corresponding tubes. These coil voltages are impressed upon the condensers 229 and 230 respectively, the charging current for condenser 229 flowing from $224^d$ to $224^a$, condenser 229, through coil 215, back to $224^d$. The grid $224^c$ thus becomes negative. As the voltage induced in coil 215 reaches its maximum and subsequently decreases to zero, the charge of the condenser gradually leaks off, but at the moment when the voltage of the anode $224^b$ becomes positive, the grid still has a negative potential and thus prevents current flow between the main electrodes, until some time after the beginning of this half cycle. The time which elapses between the beginning of the half cycle and the moment when current starts to flow through the tube depends upon the maximum charge of the condenser and thus upon the angular position between the shafts 210 and 211. As the shaft 210 advances relative to shaft 211, the voltage in the coil 215 decreases, thereby decreasing the charge of the condensers 229 and thus also decreasing the time necessary for its discharge. The action of coil 216 and tube 225 is similar to that described. The decrease of the discharge time of the condensers in turn increases the current through the resistance 6 and decreases the field current, thereby speeding up armature 4 until both shafts again attain the same speed. If the shaft 210 tends to run slower than the shaft 211, the reverse action to that described takes place and armature 4 is slowed down as a result.

Figs. 5, 6 and 8 do not show the automatic means of maintaining the field strength of the following motors at maximum value until the motors have been synchronized. It is obvious that the same or any other suitable means may be used to bring the motor into synchronism as those illustrated and explained in connection with Figs. 1 and 3.

It will thus be seen that in all of the systems described the speed ratio between the "following" and "leading" motor is so fixed as to eliminate any gradual drift so that the ratio of the total revolutions of both motors remains the same for any length of time of operation. The systems further maintain the "leading" motor shaft and the related secondary shaft of the speed change gear of the "following" motor in synchronism with a fixed average angular relation therebetween.

What we claim as new and desire to secure by Letters Patent is:

1. In combination, a rotating member, a second rotating member to be operated in synchronism with said first member, a direct current supply, a direct current motor for driving said second member and having a field winding energized from said supply, a gaseous electron tube for varying the current in said winding and having a grid and means associated with said members to impress upon said grid a voltage varying in response to tendencies of said members to depart from synchronism.

2. In combination, a rotating member, a second rotating member to be operated in synchronism with said first member, a direct current supply, a direct current motor for driving said second member and having a field winding energized from said supply, a gaseous electron tube supplied with an interrupted current for varying the current in said winding and having a grid and means associated with said members to impress upon said grid a voltage which varies in response to tendencies of said members to depart from synchronism, to thereby delay restarting of current in the tube after interruption thereof.

3. In combination, a rotating member, a second member normally rotating in synchronism with said first member, a direct current supply, a motor for driving said second member and having a regulating winding energized from said supply, a gaseous discharge tube in circuit with said winding and having an anode and a grid, means to impress a transient potential upon said anode and grid to stop the discharge current of the tube, and means associated with said members to impress upon said grid a voltage which varies in response to tendencies of said members to depart from synchronism, to thereby regulate the time during which the tube is non-conducting.

4. In combination, a rotating member, a second member normally rotating in synchronism with said first member, a direct current supply, a motor for driving said second member, and having a regulating winding energized from said supply, a gaseous discharge tube in circuit with said winding to control the current of the latter and having an anode and a grid, means associated with said first member to periodically impress a transient potential on said anode to stop the flow of current through the tube, means in circuit with said grid to cause it to prevent restarting of said current, and means associated with said second member and responding to tendencies of said member to depart from synchronism, to affect said grid so as to permit restarting of said current.

5. In combination, a rotating member, a second member normally rotating in synchronism with said first member, a direct current motor having an armature and a field winding, current supply means for said winding, a gaseous discharge tube in circuit with said field winding to control its current and having a cathode, an anode and a grid, a resistance in parallel with said tube, a condenser and a second resistance connected in parallel with said field winding, a commutator connected to said first member for periodically connecting said condenser in parallel with said tube to stop the flow of current therethrough, a second condenser and a third resistance in circuit with said grid for connecting said second condenser to the cathode of said tube and a commutator connected to said second member for periodically connecting said third resistance across the current supply for said field circuit and to affect said grid to permit restarting of current through said tube.

6. In combination, a rotating member, a second member normally rotating in synchronism with said first member, a direct current supply, a motor for driving said second member and having a field winding energized from said supply, a gaseous discharge tube in circuit with said winding and having an anode and grid, means to control the current supplied to said winding by said tube, said means including means to impress transient potentials upon said anode and grid to stop the discharge current of the tube, and means associated with said members to impress upon said grid a voltage which varies in response to tendencies of said members to depart from synchronism, whereby the time during which the tube is non-conducting is regulated.

7. In combination, a rotating member, a second member normally rotating in synchronism with said first member, a direct current supply, a motor for driving said second member and having a field winding connected to said supply, a gaseous discharge tube in circuit with said winding and having an anode and grid, means to control the current supplied to said winding by said tube, said means including means to impress transient potentials upon said anode and grid to stop the discharge current of the tube, a potentiometer resistance and commutator associated with each member and supplied with a voltage, said commutators operating to commutate the current due to said voltage and impress upon the grid a resulting potential which varies in response to tendencies of said members to depart from synchronism, whereby the time during which the tube is non-conducting is regulated.

8. In combination, a rotating member, a second member, normally rotating in synchronism with said first member, a direct current supply, a motor for driving said second member and having a field winding connected to said supply, means to control the current supplied to said winding including a gaseous discharge tube in circuit with said winding and having an anode and grid, a second tube having an anode and grid, energy storage means associated with each tube and capable of producing transient potentials on its anode and grid as a function of starting of current flow in the other tube, and adjustable energy storage circuits, responsive to a voltage varying in accordance with tendencies of said members to depart from synchronism for regulating the time intervals during which the grids maintain their respective tubes non-conducting.

9. In combination, a rotating member, a second member, normally rotating in synchronism with said first member, a direct current supply, a motor for driving said second member and having a field winding connected to said supply, means to control the current supplied to said winding by said supply including a gaseous discharge tube in circuit with said winding and having an anode and a grid, a second tube having an anode and grid, energy storage means associated with each tube and capable of producing transient potentials on its anode and grid as a function of starting of current flow in the other tube, adjustable energy storage circuits, means connected with each grid for controlling the discharge of said energy in accordance with tendencies of said members to depart from synchronism, whereby the time interval during which the grids maintain their respective tubes non-conducting is regulated.

10. In combination, a rotating member, a second rotating member to be operated in synchronism with said first member, a motor for driving said second member, a power supply, and a regulating resistance for said motor, thermionic means for varying said resistance and means associated with said rotating members respectively and cooperating to control the thermionic means in response to tendencies of said members to depart from synchronism, and means including an electron tube for preventing functioning of the control means for said thermionic means during the starting period of said motor.

11. In combination, a rotating member, a second member normally rotating in synchronism with said first member, a direct current supply, a motor for driving said second member and having a field winding connected to said supply, a gaseous discharge tube in circuit with said winding and having an anode and grid, means to control the current supplied to said winding by said tube, said means including means to impress transient potentials upon said anode and grid to stop the discharge current of the tube, means associated with said members to impress upon said grid a voltage which varies in response to tendencies of said members to depart from synchronism, whereby the time during which the tube is non-conducting is regulated, and means including an electron tube for preventing functioning of the last mentioned means during the starting period of said motor.

12. In combination, a rotating member, a second member normally rotating in synchronism with said first member, a direct current supply, a motor for driving said second member and having a field winding connected to said supply, a gaseous discharge tube in circuit with said winding and having an anode and grid, means to control the current supplied to said winding by said tube, said means including means to impress transient potentials upon said anode and grid to stop the discharge current of the tube, a potentiometer resistance and commutator associated with each member and supplied with a voltage, said commutators operating to commutate the current due to said voltage and impress upon the grid a resulting potential which varies in response to tendencies of said members to depart from synchronism, whereby the time during which the tube is non-conducting is regulated, and means including an electron tube for preventing functioning of the last mentioned means during the starting period of said motor.

13. In combination, a rotating member, a second member, normally rotating in synchronism with said first member, a direct current supply, a motor for driving said second member and having a field winding connected to said supply, means to control the current supplied to said winding including a gaseous discharge tube in circuit with said winding and having an anode and grid, a second tube having an anode and grid, energy storage means associated with each tube and capable of producing transient potentials on its anode and grid as a function of starting of current flow in the other tube, adjustable energy storage circuits, responsive to a voltage varying in accordance with tendencies of said members to depart from synchronism for regulating the time intervals during which the grids maintain their respective tubes non-conducting, and means including an electron tube for preventing response of said energy storage circuits to said voltage during the starting period of said motor.

14. In combination, a rotating member, a second member, normally rotating in synchronism with said first member, a direct current supply, a motor for driving said second member and having a field winding connected to said supply, means to control the current supplied to said winding by said supply including a gaseous discharge tube in circuit with said winding and having an anode and a grid, a second tube having an anode and grid, energy storage means associated with each tube and capable of producing transient potentials on its anode and grid as a function of starting of current flow in the other tube, adjustable energy storage circuits, means connected with each grid for controlling the discharge of said energy in accordance with tendencies of said members to depart from synchronism, whereby the time interval during which the grids maintain their respective tubes non-conducting is regulated, and means including an electron tube for preventing functioning of said last mentioned means during the starting period of said motor.

15. In combination, a rotating member, a second member, normally rotating in synchronism with said first member, a direct current supply, a motor for driving said second member and having a field winding connected to said supply, means to control the current supplied to said winding by said supply including a gaseous discharge tube in circuit with said winding and having an anode and a grid, a second tube having an anode and grid, energy storage means associated with each tube and capable of producing transient potentials on its anode and grid as a function of starting of current flow in the other tube, adjustable energy storage circuits, means connected with each grid for controlling the discharge of said energy in accordance with tendencies of said members to depart from synchronism, whereby the time interval during which the grids maintain their respective tubes non-conducting is regulated, and means including an electron tube connected in circuit with said last mentioned means and having a grid and cooperating contacts associated with said rotating members for commutating said grid circuit in accordance with the angular relation of said rotating members to control the conduction of said electron tube to thereby initiate functioning of said last mentioned means when said rotating members have the correct angular position relative to each other.

16. In combination, a rotating member, a second member, normally rotating in synchronism with said first member, a direct current supply, a motor for driving said second member and having a field winding connected to said supply, means to control the current supplied to said winding by said supply including a gaseous discharge tube in circuit with said winding and having an anode and a grid, a second tube having an anode and grid, energy storage means associated with each tube and capable of producing transient potentials on its anode and grid as a function of starting of current flow in the other tube, adjustable energy storage circuits, means connected with each grid for controlling the discharge of said energy in accordance with tendencies of said members to depart from synchronism, whereby the time interval during which the grids maintain their respective tubes non-conducting is regulated, and means including an electromagnetic relay controlling said last mentioned means, an electron tube in circuit with a winding of said relay and having a grid and cooperating contacts associated with said rotating members for commutating said grid circuit in accordance with the angular relation of said rotating members to control the conduction of said electron tube to thereby initiate functioning of said last mentioned means when said rotating members have the correct angular position relative to each other.

17. In combination, a rotating member, a second member normally rotating in synchronism with said first member, a direct current supply, a motor for driving said second member and having a field winding, an impedance connected in series with said field winding and said direct current supply, means to control the direct current supplied to said winding, said means including a gaseous discharge tube having a grid and an alternating current supply circuit connected in series and forming a shunt path to said impedance, said means also including means to impress a potential upon said grid to control starting of the flow of alternating current through the tube during the positive half cycle, and means associated with said members to vary said grid potential in response to tendencies of said members to depart from synchronism.

18. In combination, a rotating member, a second member normally rotating in synchronism with said first member, a direct current supply, a motor for driving said second member and having a field winding, an impedance connected in series with said field winding and said direct current supply, means to control the direct current supplied to said winding, said means including a gaseous discharge tube and an alternating current supply circuit connected in series and forming a shunt path to said impedance, said means also including a transformer having a primary winding supplied with alternating current and rotating in synchronism with one of said members and a secondary winding rotating in synchronism with the other members and having induced in it a voltage which varies with the angular displacement between said windings, and means to impress the potential of said secondary winding upon said grid to control starting of the flow of alternating current through the tube during the positive half cycle.

19. In a regulator system, in combination, a member rotating at a given speed, a plurality of shafts, a direct current motor for operating each of said shafts, a current supply, each of said motors having a field winding connected to said supply, a gaseous discharge tube in circuit with said winding and having a cathode, an anode and a grid, a resistance in parallel with said tube, a condenser and a second resistance connected in parallel with said field winding, a second condenser in circuit with said grid, a third resistance for connecting said second condenser to the cathode of said tube, a commutator connected to said motor for periodically connecting said third resistance across the current supply and to affect said grid to permit current flow through said tube and a commutator connected to said member for periodically connecting the several first mentioned condensers in parallel with their respective tubes to stop the flow of current therethrough, said first-mentioned commutators and said second mentioned commutator co-acting to maintain the speed ratio between said motors and said member constant.

20. In combination, a rotating member, a second rotating member to be operated in synchronism with said first member, a direct current supply, a direct current motor for driving said second member and having a field winding energized from said supply, a gaseous electron tube supplied with a varying potential for varying the current in said winding and having a grid and means associated with said members to impress upon said grid a voltage which varies in response to tendencies of said members to depart from synchronism to thereby modify the effect of said varying potential.

CARROLL STANSBURY.
GLENDON C. BROWN.